(12) United States Patent
Yeom (10) Patent No.: US 12,294,118 B2
(45) Date of Patent: May 6, 2025

(54) BATTERY PACK

(71) Applicant: SAMSUNG SDI CO., LTD., Yongin-si (KR)

(72) Inventor: Gilchoun Yeom, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 14 days.

(21) Appl. No.: 17/667,664

(22) Filed: Feb. 9, 2022

(65) Prior Publication Data

US 2022/0255195 A1     Aug. 11, 2022

(30) Foreign Application Priority Data

Feb. 10, 2021  (KR) ................ 10-2021-0019356

(51) Int. Cl.
   *H01M 50/519*  (2021.01)
   *H01M 50/213*  (2021.01)
   *H01M 50/284*  (2021.01)
   *H01M 50/505*  (2021.01)
   *H01M 50/522*  (2021.01)

(52) U.S. Cl.
   CPC ....... *H01M 50/519* (2021.01); *H01M 50/213* (2021.01); *H01M 50/284* (2021.01); *H01M 50/505* (2021.01); *H01M 50/522* (2021.01)

(58) Field of Classification Search
   CPC .................................................. H01M 50/533
   See application file for complete search history.

(56) References Cited

U.S. PATENT DOCUMENTS

| 6,225,778 | B1 | 5/2001 | Hayama et al. |
| 7,858,221 | B2 * | 12/2010 | Sato |
| 2009/0023053 | A1 | 1/2009 | Berdichevsky et al. |
| 2010/0248008 | A1 * | 9/2010 | Sugawara |
| 2014/0037994 | A1 | 2/2014 | Lee |
| 2017/0084963 | A1 * | 3/2017 | Park .................. H01M 10/425 |
| 2021/0184281 | A1 | 6/2021 | Fuchs et al. |
| 2022/0328925 | A1 | 10/2022 | Kuboki et al. |

FOREIGN PATENT DOCUMENTS

| AU | 2019260525 A1 * | 10/2020 | ......... H01M 10/486 |
| CN | 101118961 B * | 12/2012 | ......... H01M 10/052 |
| DE | 202017100572 U1 | 5/2017 | |
| JP | 2001-325939 A | 11/2001 | |

(Continued)

OTHER PUBLICATIONS

Korean Office action mailed Oct. 13, 2022 for corresponding KR Patent Application No. 10-2021-0019356.

(Continued)

*Primary Examiner* — Matthew T Martin
*Assistant Examiner* — Krishna R Hammond
(74) *Attorney, Agent, or Firm* — Lee IP Law, P.C.

(57) ABSTRACT

A battery pack includes at least one battery cell, a circuit board electrically connected to the at least one battery cell, and a conductive block electrically connecting the at least one battery cell and the circuit board to each other, the conductive block having a first surface, the first surface including a first metal and a second metal different from the first metal, and a second surface in contact with the first surface along an edge, the second metal including the second metal.

17 Claims, 6 Drawing Sheets

(56) References Cited

FOREIGN PATENT DOCUMENTS

| | | |
|---|---|---|
| JP | 2003-077451 A | 3/2003 |
| JP | 2004-265610 A | 9/2004 |
| JP | 2011-167714 A | 9/2011 |
| JP | 2012-033299 A | 2/2012 |
| JP | 2012-123946 A | 6/2012 |
| JP | 2018-110084 A | 7/2018 |
| KR | 10-0646371 B1 | 11/2006 |
| KR | 10-0871917 B1 | 12/2008 |
| KR | 10-0994954 B1 | 7/2010 |
| KR | 10-2017-0093742 A | 8/2017 |
| KR | 10-1916963 B1 | 11/2018 |
| WO | WO 2009/011748 A1 | 1/2009 |
| WO | WO 2012/171071 A1 | 12/2012 |
| WO | WO 2020/255876 A1 | 12/2020 |

OTHER PUBLICATIONS

Extended European Search Report mailed Jul. 4, 2022 for corresponding EP Patent Application No. 22156058.4.
Japanese Office Action issued Apr. 3, 2023.

\* cited by examiner

BATTERY PACK

CROSS-REFERENCE TO RELATED APPLICATION

This application is based on and claims priority under 35 U.S.C. § 119 to Korean Patent Application No. 10-2021-0019356, filed on Feb. 10, 2021, in the Korean Intellectual Property Office, the disclosure of which is incorporated by reference herein in its entirety.

BACKGROUND

1. Field

One or more embodiments relate to a battery pack.

2. Description of the Related Art

In general, secondary batteries refer to batteries that can be repeatedly charged and discharged unlike non-rechargeable primary batteries. Secondary batteries are used as energy sources of devices, e.g., mobile devices, electric vehicles, hybrid electric vehicles, electric bicycles, and uninterruptible power supplies. Single-cell secondary batteries or multi-cell secondary batteries (secondary battery packs) in which a plurality of battery cells are connected as one unit are used according to the types of external devices that use the secondary batteries.

Unlike small mobile devices, e.g., cellular phones, capable of operating for a certain period of time using a single battery, large mobile devices, e.g., laptop computers, or high-power consuming devices, e.g., electric vehicles or hybrid vehicles, which have long operation times and require high power driving, may require battery packs, which include a plurality of batteries (battery cells). Such battery packs may require increased power and capacity, e.g., output voltages or currents of such battery packs may be increased by adjusting the number of batteries included in each battery pack.

SUMMARY

According to one or more embodiments, a battery pack may include a battery cell, a circuit board electrically connected to the battery cell, and a conductive block electrically connecting the battery cell and the circuit board to each other, the conductive block including a first surface and a second surface which are in contact with each other along an edge, wherein first and second metals, which are different from each other, are arranged on the first surface of the conductive block, and the second metal is arranged on the second surface of the conductive block.

The battery cell may include a plurality of battery cells, and the battery pack may further include a bus bar electrically connecting the plurality of battery cells to each other.

For example, the first surface of the conductive block may include a connection point for connection with the bus bar, and the second surface of the conductive block may include a connection point for connection with the circuit board.

For example, a first connection member may be between the first surface of the conductive block and the bus bar, and a second connection member may be between the second surface of the conductive block and the circuit board.

For example, the first connection member may include a conductive wire or a conductive ribbon.

For example, the second connection member may include a soldering material.

For example, the first metal may include a metal that is identical to a metal of the bus bar, and the second metal may include a metal that is identical to a metal of the circuit board or a connection pad formed on the circuit board.

For example, the first metal may be provided in a core portion of the first surface of the conductive block, and the second metal may be provided on the first surface of the conductive block along an edge surrounding the core portion of the first surface of the conductive block.

For example, the second metal may be entirely on the second surface of the conductive block.

For example, the circuit board may include: a mounting surface on which circuit elements are mounted; and an end surface at which the mounting surface terminates.

For example, the first surface of the conductive block may be side by side with the end surface of the circuit board, and the second surface of the conductive block may be side by side with the mounting surface of the circuit board.

For example, the first surface of the conductive block may be aligned with the end surface of the circuit board to form an identical plane or may be at least adjacent to the end surface of the circuit board.

For example, the first surface of the conductive block and an upper end portion of the battery cell, on which electrodes are formed, may face an identical direction.

For example, the conductive block may have a solid shape in which a region between the first and second surfaces is filled.

For example, the conductive block has a hexahedral shape.

For example, the conductive block may further include a third surface opposite the first surface, a fourth surface opposite the second surface, and a fifth surface and a sixth surface which are between the first and third surfaces and connect the second and fourth surfaces to each other.

For example, the second metal may be continuously on the second surface, the fourth surface, the fifth surface, and the sixth surface along an outer periphery of the first metal, the first metal being in a core portion of the first surface of the conductive block.

For example, both the first and second metals are on the third surface, or the second metal may be entirely on the third surface.

For example, the first metal may be provided in a core portion of the third surface of the conductive block, and the second metal may be provided on the third surface of the conductive block along an edge surrounding the core portion of the third surface.

For example, the battery cell may include a plurality of battery cells arranged in a row direction, and rows of the plurality of battery cells are arranged in a transverse direction.

For example, the battery pack may further include a case accommodating the plurality of battery cells, wherein the circuit board stands in a height direction crossing the row direction and the transverse direction along one of first and second sides of the case which face each other in the row direction.

BRIEF DESCRIPTION OF THE DRAWINGS

Features will become apparent to those of skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Hereinafter, a battery pack will be described according to embodiments with reference to the accompanying drawings.

Figure 1:
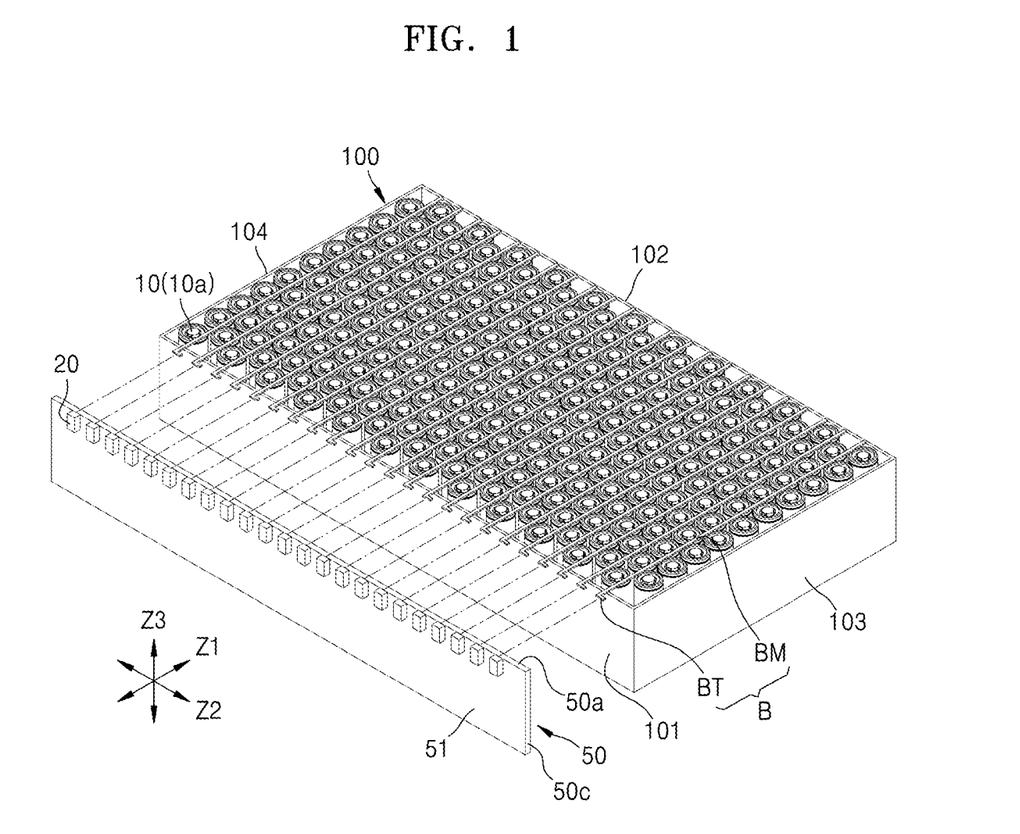
FIG. 1 is an exploded perspective view of a battery pack according to an embodiment.
Figure 2:
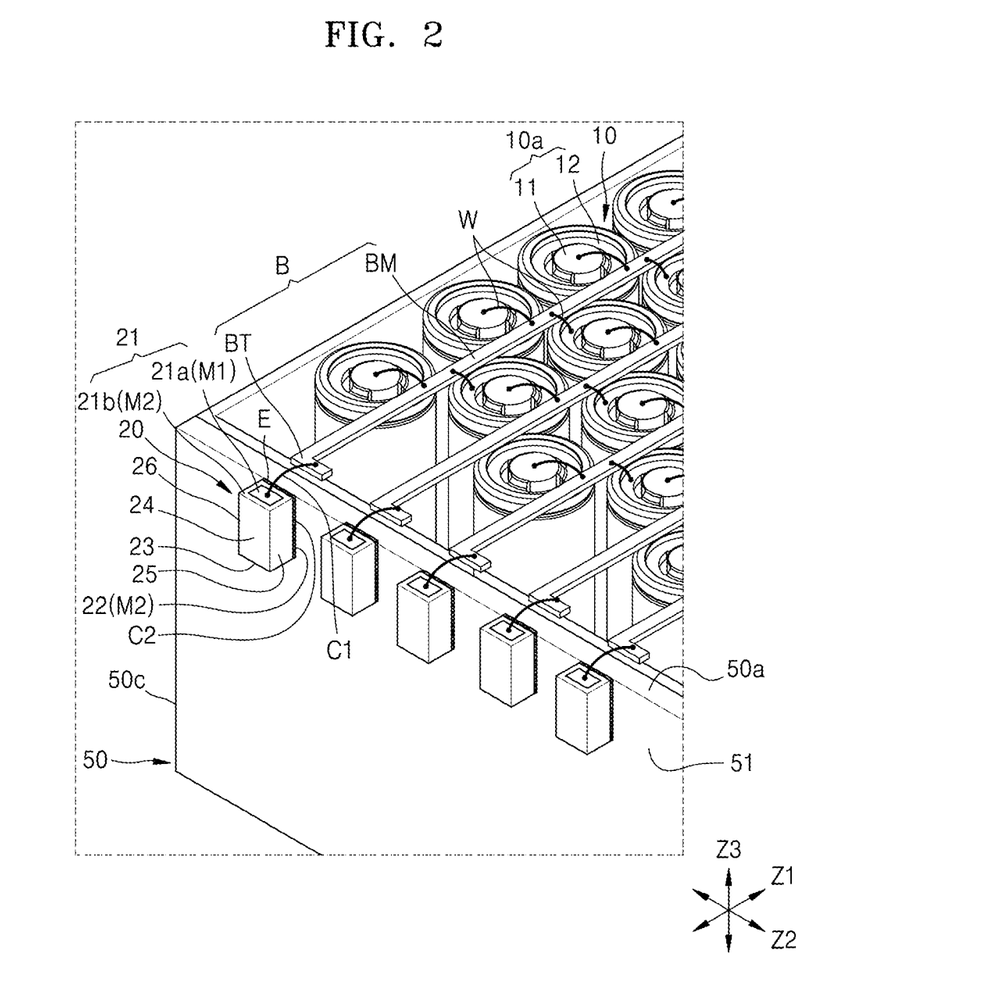
FIG. 2 is a perspective enlarged view of conductive blocks in FIG. 1.
Figure 3:
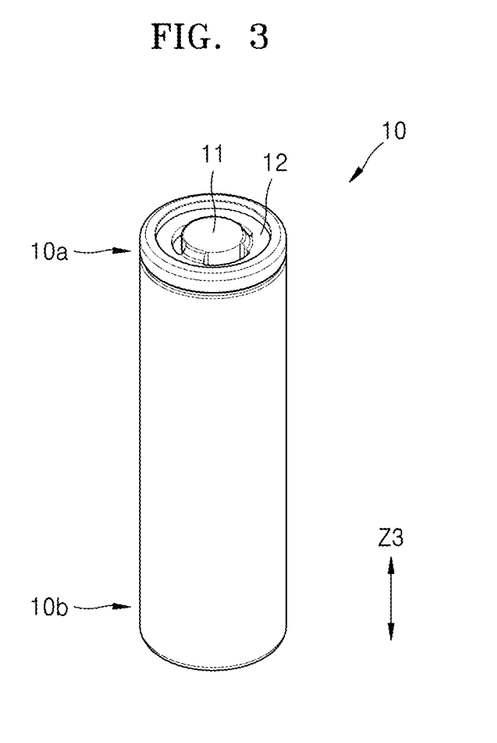
FIG. 3 is a perspective enlarged view of a battery cell in FIG. 1.
Figure 4:
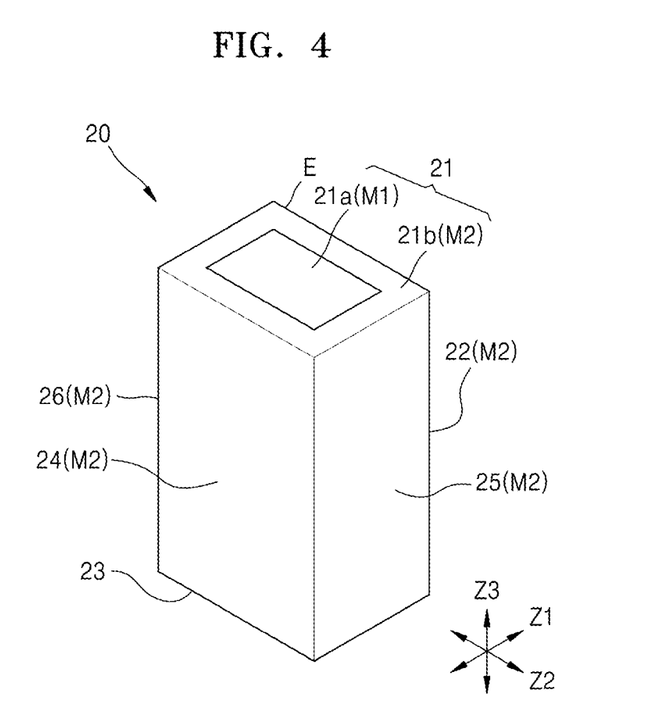
FIG. 4 is a perspective enlarged view of a conductive block in FIG. 1.
Figure 5:
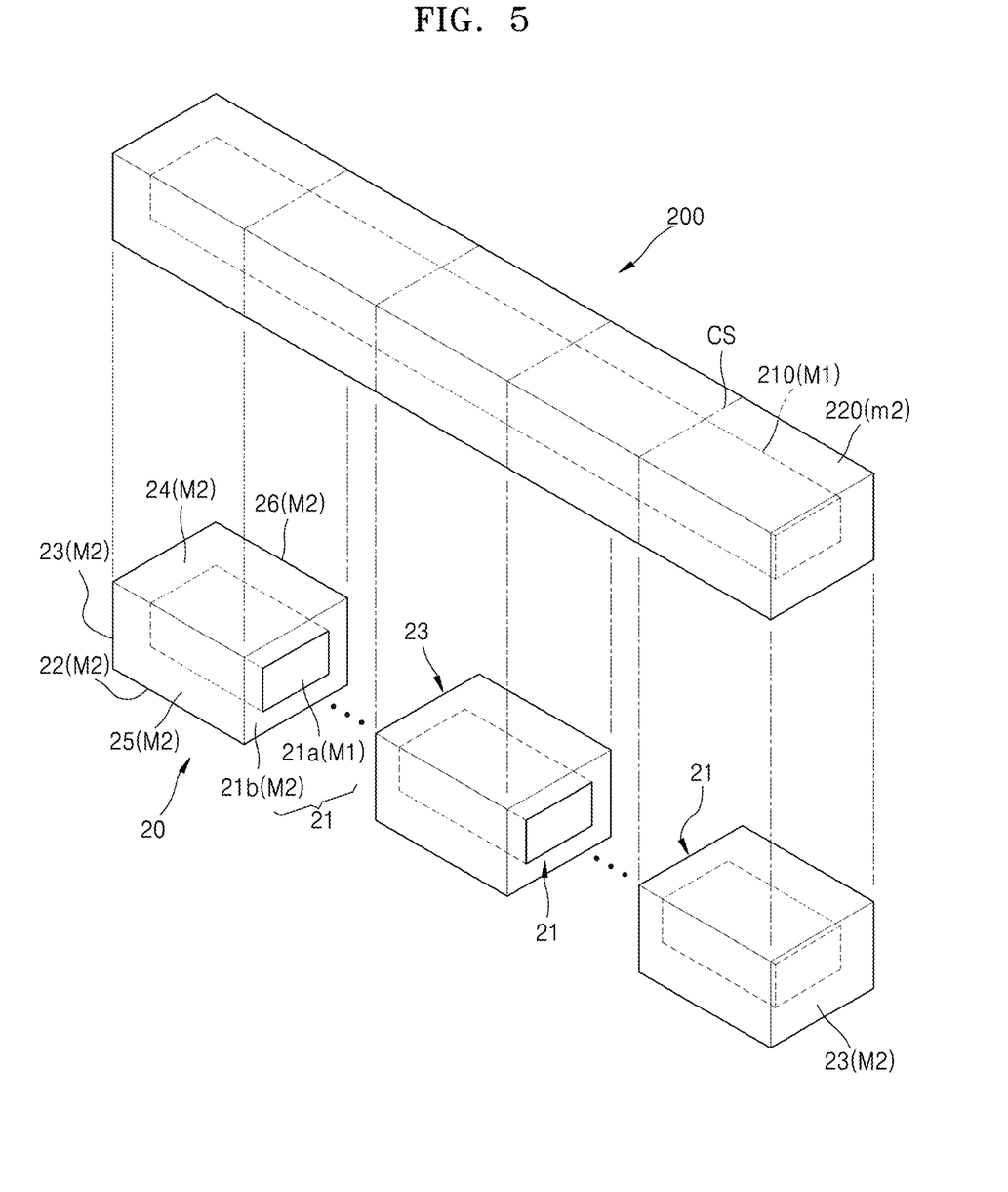
FIGS. 5 and 6 are different perspective views of the formation and connection of the conductive blocks in FIG. 1.
Figure 6:
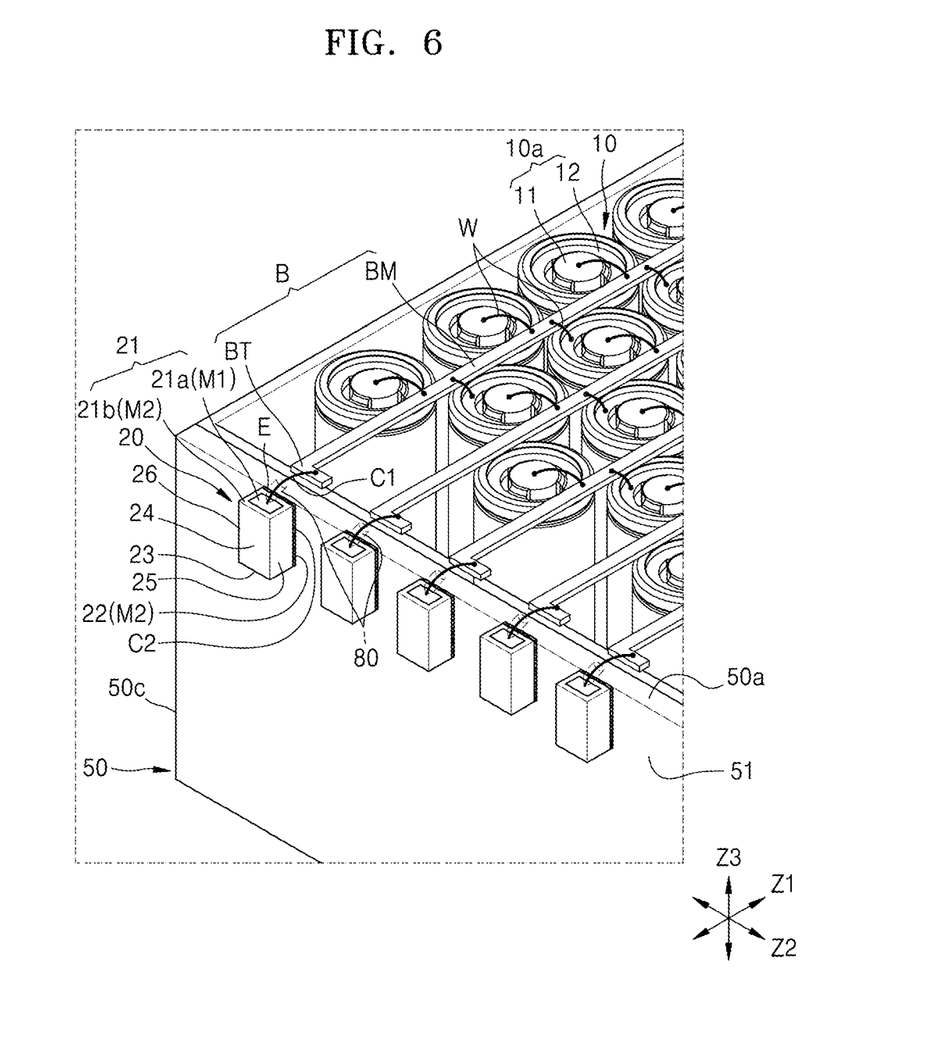

FIG. 1 is an exploded perspective view illustrating a battery pack according to an embodiment. FIG. 2 is a perspective view illustrating a connection of conductive blocks 20 shown in FIG. 1. FIG. 3 is a perspective view illustrating a battery cell 10 shown in FIG. 1. FIG. 4 is a perspective view illustrating a conductive block 20 shown in FIG. 1. FIGS. 5 and 6 are different perspective views illustrating the formation and connection of the conductive blocks 20 shown in FIG. 1.

Referring to FIGS. 1 to 6, according to an embodiment, a battery pack may include a battery cell 10, a circuit board 50 electrically connected to the battery cell 10, and a conductive block 20 that electrically connect the battery cell 10 and the circuit board 50 to each other. The conductive block 20 may include first and second surfaces 21 and 22 that are in contact with each other along an edge E. In addition, first and second metals M1 and M2 that are different from each other may be formed on the first surface 21 of the conductive block 20, and the second metal M2 may also be formed on the second surface 22 of the conductive block 20.

In detail, the battery cell 10 may include one or more battery cells 10. In an embodiment, the battery cell 10 may include a plurality of battery cells 10 which are electrically connected to each other through bus bars B. In an embodiment, the battery cell 10 may include a plurality of battery cells 10 arranged in a row direction Z1, and rows of the plurality of battery cells 10 may be arranged in a transverse direction Z2. In an embodiment, the plurality of battery cells 10 arranged in the row direction Z1 may be connected in parallel to each other, and adjacent rows of the battery cells 10 may be connected in series to each other in the transverse direction Z2.

Referring to FIG. 3, each of the battery cells 10 may include an upper end portion 10a and a lower end portion 10b in a height direction Z3 crossing the row direction Z1 and the transverse direction Z2, and first and second electrodes 11 and 12 that are different from each other may be formed on the upper end portion 10a of the battery cell 10. In an embodiment, the first and second electrodes 11 and 12 may respectively be formed at a center position and an edge position of the upper end portion 10a of each of the battery cells 10.

As shown in FIG. 2, in an embodiment, the first and second electrodes 11 and 12, which are formed on the upper end portions 10a of the battery cells 10, may be connected to the bus bars B through connection members W. In this case, the connection members W may include conductive wires or conductive ribbons. In an embodiment, the first and second electrodes 11 and 12 of adjacent battery cells 10 may be connected in parallel or series to each other by connecting electrodes 11 and 12 of the same polarity or different polarities to a bus bar B. In this case, the bus bar B may electrically connect the adjacent battery cells 10 to each other by connecting the first and second electrodes 11 and 12 of the adjacent battery cells 10 to each other. In an embodiment, the first and second electrodes 11 and 12 of adjacent battery cells 10 arranged in the row direction Z1 may be connected to a bus bars B in a manner such that electrodes 11 and 12 of the same polarity are connected to the bus bars B, to connect the adjacent battery cells 10 arranged in the row direction Z1 in parallel to each other. Furthermore, in an embodiment, the first and second electrodes 11 and 12 of adjacent battery cells 10 arranged in the transverse direction Z2 may be connected to the bus bars B in a manner such that electrodes 11 and 12 of different polarities are connected to the bus bars B, to connect the adjacent battery cells 10 arranged in the transverse direction Z2 in series to each other.

The bus bars B may electrically connect adjacent battery cells 10 to each other and may connect the battery cells 10 to the circuit board 50. In other words, the battery cells 10 electrically connected to each other may be connected to the circuit board 50 through the bus bars B, and electricity discharged from the battery cells 10 may be supplied to an external load through the circuit board 50 or charging electricity of an external charger may be supplied to the battery cells 10 through the circuit board 50. That is, the battery cells 10 may be electrically connected to an external load or an external charger through the circuit board 50. In various embodiments, the circuit board 50 may be electrically connected to the battery cells 10 to mediate the flow of electricity to an external load or from an external charger and control the charge and discharge operations of the battery cells 10 by obtaining state information, e.g., voltage signals of the battery cells 10.

Throughout the present specification, the expression "the circuit board 50 is electrically connected to the battery cells 10" may mean that charge/discharge electricity may be output to an external device from the battery cells 10 through the circuit board 50 or may be input from an external device to the battery cells 10 through the circuit board 50, or may mean that state information, e.g., information on the voltages of the battery cells 10, may be obtained through the circuit board 50.

Each of the bus bars B, which are for electrically connecting the battery cells 10 to each other, may include a body portion BM connected to battery cells 10 and a connection end BT formed at an end of the body portion BM and extending from the body portion BM for connection with the circuit board 50. In an embodiment, each of the bus bars B may extend in the row direction Z1 between adjacent rows of battery cells 10 and may electrically connect the battery cells 10 in the adjacent rows to each other. In this case, the body portion BM of the bus bar B may extend between battery cells 10 which are adjacent in the row direction Z1, and the connection end BT of the bus bar B may be bent from the body portion BM extending in the row direction Z1 and may form an end portion of the bus bar B connected to the circuit board 50.

Referring to FIG. 1, the circuit board 50 may be arranged along an edge of a case 100 in which the battery cells 10 are accommodated. For example, the battery cells 10 may be accommodated in a storage space formed in the case 100 and may be physically bound to each other by the case 100. In an embodiment, the battery cells 10 may be accommodated in the case 100, and ribs, which surround the battery cells 10 to define assembly positions of the battery cells 10, may be formed in the case 100. Throughout the present specification, the case 100 may provide an accommodation space for accommodating the battery cells 10 or may have ribs surrounding the battery cells 10 and defining the assembly positions of the battery cells 10. For example, in an embodiment, the battery cells 10 may be physically bound to each other while being fitted to ribs formed in the case 100, and may be modularized in the form of a single pack while being electrically connected to each other through the bus bars B. In this sense, the term "case 100" may be used herein in a broad sense including a cell holder.

In an embodiment, the circuit board 50 may be arranged along an edge of the case 100 in which the battery cells 10 are accommodated. For example, the case 100 may include first and second sides 101 and 102 facing each other in the row direction Z1, and third and fourth sides 103 and 104 facing each other in the transverse direction Z2 crossing the row direction Z1. In an embodiment, the circuit board 50 may be arranged on the first and/or second sides 101 and 102 facing each other in the row direction Z1, e.g., on the first side 101. In an embodiment, the circuit board 50 may be arranged on any one of the first and second sides 101 and 102 facing each other in the row direction Z1, e.g., on the first side 101 adjacent to the connection ends BT of the bus bars B such that the circuit board 50 may be adjacent to end portions of the bus bars B (i.e., adjacent to the connection ends BT of the bus bars B which extend in the row direction Z1). In other words, the bus bars B may extend in the row direction Z1, and the circuit board 50 may be electrically connected to the connection ends BT of the bus bars B while extending across the connection ends BT of the bus bars B in the transverse direction Z2 crossing the row direction Z1.

The circuit board 50 may stand in the height direction Z3 of the battery cells 10. Here, the height direction Z3 may correspond to a direction crossing the row direction Z1 and the transverse direction Z2 and may also correspond to the height direction of the circuit board 50 or the battery cells 10. The circuit board 50 may be arranged along an edge (corresponding to the first side 101) of the case 100, in which the battery cells 10 are accommodated, in a state in which the circuit board 50 stands in the height direction Z3 of the battery cells 10, and thus the battery pack may have a compact shape and occupy a small space.

Conductive blocks 20, which are for connection with the bus bars B, may be arranged on the circuit board 50. In an embodiment, the circuit board 50 may be connected to the bus bars B while extending in the transverse direction Z2 in which the bus bars B are arranged, and may include the conductive blocks 20 arranged in the transverse direction Z2 at positions corresponding to, e.g., overlapping, the bus bars B. In various embodiments, the conductive blocks 20 are for mediating electrical connection between the circuit board 50 and the bus bars B, and one or a plurality of conductive blocks 20 may be arranged on the circuit board 50 according to the number of bus bars B to be connected to the conductive blocks 20, e.g., in a one-to-one correspondence.

Referring to FIG. 2, each of the conductive blocks 20, which are for mediating electrical connection between the circuit board 50 and the bus bars B, may include the first surface 21 providing a connection point for connection with a bus bar B, and the second surface 22 providing a connection point for connection with the circuit board 50. Here, the term "connection point" may refer to a position at which the conductive block 20 is coupled or connected to the bus bar B or the circuit board 50, and may refer to a position at which physical coupling and electrical connection are both formed. However, in various embodiments, the term "connection point" may refer to a position at which the conductive block 20 is physically coupled to or electrically connected to the bus bar B or the circuit board 50, and throughout the present specification, the term "connection point" may be used in a broad sense.

Each of the conductive blocks 20 may include the first and second surfaces 21 and 22 which are in contact with each other along an edge E, and the first surface 21 providing a connection point for connection with the bus bar B and the second surface 22 providing a connection point for connection with the circuit board 50 may be in, e.g., direct, contact with each other through the edge E of the conductive block 20. For example, the first and second surfaces 21 and 22 may correspond to two adjacent surfaces of the conductive block 20 that are in contact with each other along the edge E. In an embodiment, each of the conductive blocks 20 may have a hexahedral shape having six surfaces, and the first and second surfaces 21 and 22 may correspond to two adjacent surfaces among the six surfaces of the conductive block 20, e.g., the first and second surfaces 21 and 22 may be perpendicular to each other.

The orientations of the first and second surfaces 21 and 22 of the conductive blocks 20 may be defined relative to the circuit board 50. In an embodiment, the circuit board 50 may include a mounting surface 51 on which circuit elements are mounted, and end surfaces 50a and 50c at which the mounting surface 51 terminates. For example, the mounting surface 51 of the circuit board 50 may correspond to a surface extending in the height direction Z3 and the transverse direction Z2, e.g., the mounting surface 51 may be a major surface that faces away from the case 100, and the end surfaces 50a and 50c of the circuit board 50 may include a first end surface 50a at which the circuit board 50 terminates in the height direction Z3 and a second end surface 50c at which the circuit board 50 terminates in the transverse direction Z2. For example, referring to FIG. 1, the first end surface 50a may extend in a plane defined by the Z1 and Z2 directions, e.g., an area of the first end surface 50a may be smaller than that of the mounting surface 51, and the second end surface 50c may extend in a plane defined by the Z1 and Z3 directions, e.g., an area of the second end surface 50c may be smaller than each of the first end surface 50a and the mounting surface 51.

Here, the first surface 21 of each of the conductive block 20 may be arranged side by side with the first end surface 50a at which the circuit board 50 terminates in the height direction Z3, and the second surface 22 of each of the conductive blocks 20 may be arranged side by side with the mounting surface 51 of the circuit board 50. For example, referring to FIG. 2, the first surface 21 of each of the conductive block 20 and the first end surface 50a may be adjacent to each other along the Z1 direction, while the first surface 21 and the first end surface 50a are parallel to each other and face a same direction. For example, referring to FIG. 2, the second surface 22 of each of the conductive blocks 20 and the mounting surface 51 may be adjacent to each other along the Z1 direction, such that the second surface 22 and the mounting surface 51 face each other.

In detail, the first surface 21 of each of the conductive blocks 20 may be arranged on the same plane as the first end surface 50a of the circuit board 50 or may be at least adjacent to the first end surface 50a of the circuit board 50. For example, the first surface 21 of each of the conductive blocks 20 and the first end surface 50a of the circuit board 50 may be aligned with each other substantially on the same plane. In this case, each of the conductive blocks 20 may be arranged at the uppermost position of the circuit board 50 such that the first surface 21 of the conductive block 20 and the first end surface 50a of the circuit board 50 may be aligned with each other, e.g., the first surface 21 and the first end surface 50a may be coplanar, and thus the connection distance from the uppermost position of the circuit board 50 to the bus bars B may be reduced.

In an embodiment, the bus bars B may be arranged above the upper end portions 10a of the battery cells 10, e.g., a height of the upper end portions 10a of the battery cells 10 may be between the height of the lower end portions 10b of the battery cells 10 and the height of the bus bars B along the Z3 direction. The circuit board 50 may be arranged at a height at which the first end surface 50a of the circuit board 50 is approximately aligned with the bus bars B or at a height at which the first end surface 50a of the circuit board 50 is approximately aligned with the upper end portions 10a of the battery cells 10 above which the bus bars B are arranged. In this case, the conductive blocks 20 may be aligned with the first end surface 50a having a height closest to the bus bars B, and thus the connection distance from the conductive blocks 20 to the bus bars B may be reduced. The first surfaces 21 of the conductive blocks 20 may face upward in the height direction Z3 for connection with the bus bars B arranged above the upper end portions 10a of the battery cells 10. In other words, the first surfaces 21 of the conductive blocks 20 may face upward in the height direction Z3 like the upper end portions 10a of the battery cells 10 on which the first and second electrodes 11 and 12 are formed, e.g., the first surfaces 21 of the conductive blocks 20 and the upper end portions 10a of the battery cells 10 may face a same direction (i.e., face away from the bottom of the case 100). In an embodiment, the first and second electrodes 11 and 12 may be formed on the upper end portions 10a which are upper end portions of the battery cells 10 in the height direction Z3. For example, the first surfaces 21 of the conductive blocks 20 may be arranged to face upward like the upper end portions 10a of the battery cells 10 on which the first and second electrodes 11 and 12 are formed.

Each of the conductive blocks 20 may include the first surface 21 providing a connection point for connection with the bus bar B, and the second surface 22 providing a connection point for connection with the circuit board 50. In an embodiment, to guarantee connection strength between the first surfaces 21 and the bus bars B, the first surfaces 21 may include the first metal M1, which has high affinity with the bus bars B or first connection members C1 arranged between the first surfaces 21 and the bus bars B. In addition, to guarantee connection strength with the circuit board 50, the second surfaces 22 may include the second metal M2, which has high affinity with the circuit board 50 (e.g., connection pads formed on the circuit board 50) or second connection members C2 arranged between the second surfaces 22 and the circuit board 50. In an embodiment, the first and second metals M1 and M2 may be different from each other and may respectively include aluminum and nickel. In an embodiment, the first metal M1 may include aluminum or an aluminum alloy, and the second metal M2 may include nickel or a nickel alloy.

The first and second metals M1 and M2 may be formed on the first and second surfaces 21 and 22 of the conductive blocks 20, respectively. In an embodiment, the first and second metals M1 and M2 may be formed together on the first surfaces 21 of the conductive blocks 20, and the second metal M2 may also be formed on the second surfaces 22 of the conductive blocks 20. In an embodiment, the first and second metals M1 and M2 may be formed on the first surface 21 of each of the conductive blocks 20 in such a manner that the first metal M1 is formed in a core portion 21a of the first surface 21 and the second metal M2 is formed in an edge portion 21b surrounding the core portion 21a of the first surface 21. For example, the second metal M2 may be formed along the outer periphery of the first metal M1. In an embodiment, the first metal M1 may form the core portion 21a, e.g., a center portion of the first surface 21, and the second metal M2 may be formed by plating the outer periphery of the first metal M1 which forms the core portion 21a, such that each of the conductive blocks 20 may include the first surface 21 on which the first and second metals M1 and M2 are respectively formed on the core portion 21a and the edge portion 21b, and the second surface 22 on which the second metal M2 is formed as a whole, e.g., the second surface 22 may include only the second metal M2 among the first and second metals M1 and M2. For example, referring to FIG. 4, the first surface 21 may include the first metal M1 in a center, with the second metal M2 completely surrounding a perimeter of the first metal M1, and the second surface 22 may include only the second metal M2, e.g., the second surface 22 may consist essentially of the second metal M2.

Referring to FIG. 5, a metal block 200 may include a core portion 210 containing the first metal M1 (indicated with a dashed line in FIG. 5), and a plating layer 220 containing the second metal M2. The core portion 210 may be plated with the plating layer 220, such that the metal block 200 may include the first metal M1 and the second metal M2 formed on the surface of the first metal M1. Then, the metal block 200 may be cut into parts having a unit size to form the conductive blocks 20. In this case, the metal block 200 may be cut into the conductive blocks 20, such that each of the conductive blocks 20 may be configured to have the first metal M1 in the core portion 21a exposed on the first surface 21 corresponding to a cut surface CS, and the second metal M2 is formed partially on the first surface 21 along the outer periphery of the first metal M1 and entirely on the second surface 22 corresponding to a surface of the metal block 200. Throughout the present specification, the outer periphery of the first metal M1 may include lateral surfaces surrounding the first metal M1, i.e., lateral surfaces continuously adjacent to each other in a rotation direction around the first metal M1.

In an embodiment, the first metal M1 forming the core portion 21a of the first surface 21 may be exposed on the first surface 21 corresponding to cut surface CS when the metal block 200 plated with the second metal M2 is cut in a size corresponding to the conductive blocks 20. The second metal M2 forming the edge portion 21b of the first surface 21 and the second surface 22 may be a metal plated on the surface of the metal block 200.

Referring to FIG. 4, each of the conductive blocks 20 may include the first and second surfaces 21 and 22 which are in contact with each other along the edge E, a third surface 23 which is opposite the first surface 21, a fourth surface 24 which is opposite the second surface 22, and fifth and sixth surfaces 25 and 26 which are between the first and third surfaces 21 and 23 and connect the second and fourth surfaces 22 and 24 to each other. In this case, the second metal M2 may be continuously formed along the outer periphery of the first metal M1, and for example, the second metal M2 may be continuously formed on the second surface 22, the fourth surface 24, the fifth surface 25, and the sixth surface 26 along the outer periphery of the first metal M1.

Referring to FIG. 5, in the length direction of the metal block 200 plated with the second metal M2, the second metal M2 may be formed entirely on both ends of the metal block 200, and thus in an array of conductive blocks 20 formed by cutting the metal block 200 into lengthwise units, the outermost conductive blocks 20 in the length direction of the metal block 200 may have cut surfaces CS as first surfaces and non-cut surfaces corresponding to the both ends of the metal block 200 as third surfaces 23. Thus, unlike the first surface 21, the third surface 23 of each of the outermost conductive blocks 20 may entirely include the second metal M2 instead of including the first metal M1 in t core portion 21a and the second metal M2 in the edge portion 21b. Furthermore, in the array of conductive blocks 20 formed by cutting the metal block 200, the intermediate conductive block 20 may have first and third surfaces 21 and 23 having the same structure in which the first metal M1 is in the core portion 21a and the second metal M2 is in the edge portion.

Referring to FIGS. 2 and 6, the first surfaces 21 of the conductive blocks 20 may be connected to the bus bars B, and the second surfaces 22 of the conductive blocks 20 may be connected to the circuit board 50. That is, the first surfaces 21 of the conductive blocks 20 may provide connection points for connection with the bus bars B, and the second surfaces 22 of the conductive blocks 20 may provide connection points for connection with the circuit board 50.

In an embodiment, the first surfaces 21 of the conductive blocks 20, which provide connection points for connection with the bus bars B, may be directly connected to the bus bars B or may be connected to the bus bars B with the first connection members C1 therebetween. In an embodiment, the first connection members C1 may include conductive wires or conductive ribbons, and wire bonding or ribbon bonding may be performed to bond ends of the first connection members C1 to the connection ends BT of the bus bars B and bond the other ends of the first connection members C1 to the first surfaces 21 of the conductive blocks 20. In this case, the first connection members C1 may be bonded to the core portions 21a of the first surfaces 21 of the conductive blocks 20, and because the first connection members C1 are bonded to the core portions 21a of the first surfaces 21 which include the first metal M1 having high affinity with the first connection members C1, secure connection may be made between the conductive blocks 20 and the bus bars B through the first connection members C1. In an embodiment, the first metal M1 may include the same kind of metal as the bus bars B, e.g., the first metal M1 may include aluminum. In other words, the first connection members C1 may form secure connection between the bus bars B, which include the first metal M1, and the core portions 21a of the first surfaces 21 of the conductive blocks 20, which include the first metal M1.

For example, in a wire bonding or ribbon bonding process, a first connection member C1 (conductive wire or conductive ribbon), which is continuously supplied, may be hot pressed on the first surface 21 of a conductive block 20 by using a bonding head 80 (refer to FIG. 6), thereby fixing an end of the first connection member C1 to the first surface 21 of the conductive block 20. In this case, pressing force applied from the bonding head 80 to the first surface 21 of the conductive block 20 may be supported by the second surface 22 of the conductive block 20 or may be supported by the circuit board 50 through the second surface 22 of the conductive block 20.

In an embodiment, each of the conductive blocks 20 may have a solid shape in which a region between the first and second surfaces 21 and 22 is filled, e.g., each of the conductive blocks 20 may have a solid volumetric shape that is filled with a predetermined material (rather than being empty). If the conductive block were to have a plate shape, in which the first and second surface are bent from each other with a space therebetween (rather than having a solid shape in which a region between the first and second surfaces is filled), a pressing force applied from the bonding head 80 would have not been sufficiently supported. Thus, the first surface of such a conductive block would have been bent by the pressing force applied from the bonding head 80 (rather than being supported), and the first connection member C1 would not have been securely fixed to the first surface of the conductive block due to insufficient pressing force. In an embodiment, because each of the conductive blocks 20 has a solid shape in which a region between the first and second surfaces 21 and 22 is filled, a pressing force applied from the bonding head 80 to the first surface 21 may be sufficiently supported, and thus the first connection member C1 may be securely fixed to the first surface 21 of the conductive block 20 due to sufficient pressing force applied from the bonding head 80.

In an embodiment, the connection strength of the first surface 21 of each of the conductive blocks 20 may correlate with the connection strength of the second surface 22 of the conductive block 20, and the connection strength of the second surface 22 of the conductive block 20 may be adjusted to be sufficient to support the pressing force of the bonding head 80 such that the first surface 21 may have sufficient connection strength owing to sufficient pressing force applied from the bonding head 80. In an embodiment, the second surface 22 of each of the conductive block 20 may be directly connected to the circuit board 50 or may be connected to the circuit board 50 through the second connection member C2. For example, in an embodiment, the second surface 22 of the conductive block 20 may be soldered on a connection pad of the circuit board 50, and in this case, a soldering material, i.e., the second connection member C2, may mediate the connection between the second surface 22 of the conductive block 20 and the circuit board 50, e.g., a connection pad of the circuit board 50. In addition, the second surface 22 of the conductive block 20 may include the second metal M2, e.g., nickel, having high affinity with the soldering material. For example, the second connection member C2 may form a secure coupling between the connection pad of the circuit board 50, which includes the second metal M2, and the second surface 22 of the conductive block 20, which includes the second metal M2.

According to the embodiments, the battery pack may be easily manufactured while guaranteeing a reliable connection between the battery cells 10 and the circuit board 50. That is, according to the embodiments, the battery cells 10 and the circuit board 50 may be reliably connected to each other through the conductive blocks 20, which have the first surfaces 21 containing the first metal M1 having high affinity with the bus bars B connected to the battery cells 10, and the second surfaces 22 containing the second metal M2 having high affinity with the circuit board 50 or connection pads formed on the circuit board 50. In addition, the battery pack may be easily manufactured using a wire bonding (or ribbon bonding) process while guaranteeing sufficient connection strength.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   at least one battery cell;
   a circuit board electrically connected to the at least one battery cell; and
   a conductive block electrically connecting the at least one battery cell and the circuit board to each other, the conductive block including:
   a first surface, the first surface including a first metal and a second metal different from the first metal, and
   a second surface in contact with the first surface along an edge, the second surface including the second metal,
   wherein:
   on the first surface, the first metal is included in a center portion of the first surface and the second metal is included in an edge portion of the first surface and completely surrounds an outer periphery of the first metal,
   the at least one battery cell includes a plurality of battery cells,
   the first surface of the conductive block is electrically connected to a bus bar with a first connection member interposed therebetween, the bus bar electrically connecting the plurality of battery cells to each other, and
   the second surface of the conductive block is electrically connected to the circuit board with a second connection member interposed therebetween, such that the conductive block is electrically connected to both of the bus bar and circuit board, respectively.

2. The battery pack as claimed in claim 1, wherein the first connection member includes a conductive wire or a conductive ribbon.

3. The battery pack as claimed in claim 1, wherein the second connection member includes a soldering material.

4. The battery pack as claimed in claim 1, wherein:
   the first metal includes a metal that is identical to a metal of the bus bar, and
   the second metal includes a metal that is identical to a metal of the circuit board or a connection pad on the circuit board.

5. The battery pack as claimed in claim 1, wherein the second metal is entirely on the second surface of the conductive block.

6. The battery pack as claimed in claim 1, wherein the circuit board includes a mounting surface and an end surface at which the mounting surface terminates.

7. The battery pack as claimed in claim 6, wherein:
   the first surface of the conductive block is side by side with the end surface of the circuit board, and
   the second surface of the conductive block is side by side with the mounting surface of the circuit board.

8. The battery pack as claimed in claim 7, wherein the first surface of the conductive block is aligned with the end surface of the circuit board to define a single plane or is at least adjacent to the end surface of the circuit board.

9. The battery pack as claimed in claim 1, wherein the first surface of the conductive block and an upper end portion of the at least one battery cell, which includes electrodes, face a same direction.

10. The battery pack as claimed in claim 1, wherein the conductive block has a solid shape in which a region between the first surfaces and the second surface is filled.

11. The battery pack as claimed in claim 1, wherein the conductive block has a hexahedral shape.

12. The battery pack as claimed in claim 11, wherein the conductive block further includes a third surface opposite the first surface, a fourth surface opposite the second surface, and a fifth surface and a sixth surface which are between the first and third surfaces and connect the second and fourth surfaces to each other.

13. The battery pack as claimed in claim 12, wherein the second metal is continuously on the second surface, the fourth surface, the fifth surface, and the sixth surface along an outer periphery of the first metal.

14. The battery pack as claimed in claim 12, wherein both the first metal and the second metal are on the third surface, or the second metal is entirely on the third surface.

15. The battery pack as claimed in claim 14, wherein the first metal is in a center portion of the third surface of the conductive block, and the second metal is on the third surface of the conductive block along an edge surrounding the center portion of the third surface.

16. The battery pack as claimed in claim 1, wherein the plurality of battery cells are arranged in a row direction, and rows of the plurality of battery cells are arranged in a transverse direction.

17. The battery pack as claimed in claim 16, further comprising a case accommodating the plurality of battery cells, and wherein the circuit board stands in a height direction crossing the row direction and the transverse direction along one of first and second sides of the case which face each other in the row direction.

* * * * *